United States Patent [19]

Preis et al.

[11] Patent Number: 4,526,492

[45] Date of Patent: Jul. 2, 1985

[54] ANCHORING ELEMENT FOR FIBROUS COMPOSITE MATERIALS

[75] Inventors: Lothar Preis, Bergisch-Gladbach; Jürgen Hoffmann, Cologne; Kurt Rompf, Bergisch-Gladbach, all of Fed. Rep. of Germany

[73] Assignee: Bayer Aktiengesellschaft, Leverkusen, Fed. Rep. of Germany

[21] Appl. No.: 371,028

[22] Filed: Apr. 22, 1982

[30] Foreign Application Priority Data

May 9, 1981 [DE] Fed. Rep. of Germany ....... 3118492

[51] Int. Cl.³ .......................... F16B 11/00; B25G 3/24
[52] U.S. Cl. ..................................... 403/268; 460/175; 460/177
[58] Field of Search ............... 403/268, 267, 276, 266, 403/265, 275, 277, 280; 156/294, 303.1; 264/274, 263; 29/460, 461

[56] References Cited

U.S. PATENT DOCUMENTS

| | | | |
|---|---|---|---|
| 52,793 | 2/1866 | Parker | 403/280 X |
| 87,778 | 3/1869 | Hunt | 403/277 |
| 90,935 | 7/1869 | Dewar et al. | 403/277 |
| 974,719 | 11/1910 | Stevenson | 403/268 |
| 1,381,779 | 6/1921 | Williams | 403/275 |
| 2,426,920 | 9/1947 | Bronander | 403/276 X |
| 2,874,937 | 2/1959 | Higgins | 403/265 |
| 3,129,282 | 4/1964 | Flynn | 403/275 X |
| 3,328,229 | 6/1967 | Windecker | 403/267 X |
| 3,552,787 | 1/1971 | Yee | 403/265 |

Primary Examiner—Andrew V. Kundrat
Attorney, Agent, or Firm—Sprung Horn Kramer & Woods

[57] ABSTRACT

An anchorage for a rod of fibrous composite material includes sleeve having a bore receptive of a rod, the bore being profiled substantially perpendicularly to the axis of the received rod and an element for widening the received end of the rod. The cross section of the bore is substantially similar to the cross section of the rod to be received, substantially constant along the length of the bore and greater than the non-widened cross section of the rod. A sealing compound completely fills the space between the rod, the widening element and the sleeve.

8 Claims, 7 Drawing Figures

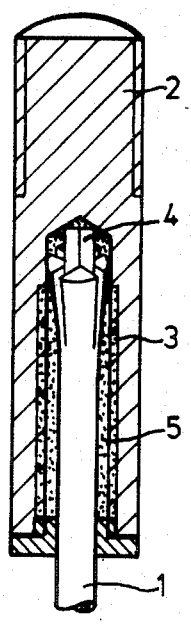
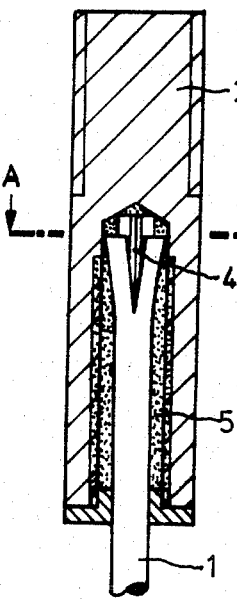
FIG. 1
FIG. 2
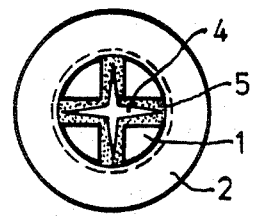
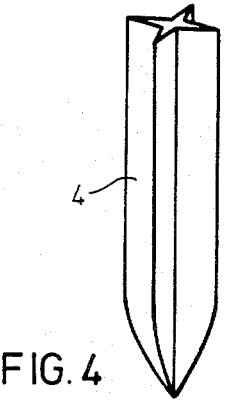
FIG. 3 (A-B)
FIG. 4

ANCHORING ELEMENT FOR FIBROUS COMPOSITE MATERIALS

BACKGROUND OF THE INVENTION

This invention relates to an anchoring element for a rod of a fibrous composite material cooperating with a bore in an anchorage, the inner surface of the bore being profiled and the profiling extending substantially perpendicularly to the rod, and one or more elements being present for widening the end of the rod.

Composite materials of high-strength fibres and reactive resins attain strengths equivalent to those of high-strength metals. In addition, composite materials of the type in question are also of interest to the user by virtue of their lower specific gravity, their better corrosion resistance and, in some cases, also by virtue of their non-conductivity.

In the case of highly anisotropic fibrous composite materials in which most of the fibres are unidirectionally oriented, anchoring gives rise to considerable difficulties. With the joining and anchoring techniques normally used for metals, such as screwing or clamping, the high tensile strengths of the rods can only be partly utilized. Such processes as welding or forming are impossible to apply.

The transmission of strong forces in fibrous composite materials requires a particular consideration to be made of stress peaks and transverse compression. In the anchorage zone, allowance has to be made, for example by the provision of intermediate compensatory layers, for the different longitudinal strains between the rod and the anchoring element. Bonded joints are limited in their effectiveness, particularly in the event of dynamic stressing. Improvements may be obtained by making the bonded joint in the form of a scarf joint or multiple-cut overlap. However, the expense which this involves is fairly considerable. Bonded anchoring elements are relatively large on account of the necessary insertion length.

With clamp-type joints, it is only partly possible to utilize the high strengh of fibrous composite materials. Clamp-type anchorages require complicated adaptation of the clamping systems used to the profile of the rods. However, this is difficult where clamps are used to balance the different longitudinal strains between the profiles and the anchoring element, so that in many cases stress peaks in the anchoring zone are responsible for premature failure, even when the forces are carefully applied over a fairly considerable area at the expense of compactness. In addition, the transverse contraction which takes place in the anchorage zone in the event of tensile stressing can lead to loosening both in the case of bonded anchorages and also in the case of clamp-type anchorages.

According to East German Pat. No. 146,362, bonding and transverse compression are combined in the anchorage. Anchoring elements of this type consist of a conical anchor sleeve which is adapted as exactly as possible to the rod which is widened by wedges or cones. In cases where fairly large forces are to be transmitted, the end of the rod and the wedges have to be joined firmly together by bonding to bring about a wedge effect (transverse compression) when loads are applied to the profile. On account of the necessary geometric adjustment, all known sleeve/wedge systems for anchoring rods of fibrous composite materials are difficult to manufacture and handle and, in addition, have the disadvantage of being relatively wide at their ends.

SUMMARY OF THE INVENTION

The object of the present invention is to provide an anchoring element for a rod of a fibrous composite material which avoids the above-mentioned disadvantages of known devices, which in particular is less complicated and with which the high strength values of fibre-reinforced rods may be better utilized.

According to the invention, this object is achieved in that, in the anchoring element, the internal cross-section of the bore is adapted to the cross-sectional form of the rod to be anchored and remains substantially constant and is larger than the non-widened rod of the fibrous composite material, and further in that the space between the rod, the widening element and the bore is completely filled with a sealing compound.

In many cases, the internally profiled bore in an anchorage corresponds to an internally profiled anchor sleeve.

However, the anchoring principle according to the invention is by no means limited to this. An internally profiled bore in a concrete structural component is also suitable for receiving the widened end of the rod.

In constrast to known anchor sleeves, there is no need for the rod to be in direct contact with the inner wall; instead the sealing compound is placed in between. The effect of the elements for widening the end of the rod is that, after sealing, for example with a reactive resin, a transverse compression anchorage zone can be directly provided by the sealing compound. In this zone, which plays an important part in the transmission of forces between the rod and the sleeve or, generally, the inner wall of the bore in an anchorage, the segments of the rod retain their natural curvature. In the case of sleeves having a conical inner bore, the wedge element has to be correspondingly prestressed in order to adapt the slotted end of the rod to the predetermined inner cone of the sleeve, inevitably altering the curvature of the rod segments which is formed in the absence of external forces and leading to locally high pressures which in turn limits the overall strength of the anchorage.

The anchoring elements according to the invention are very easy to manufacture and handle, requiring very little in the way of time and machinery. They may readily be adapted to perform a variety of functions and are relatively small. By means of the elements according to the invention, surprisingly powerful forces—both static and dynamic—may be introduced into rods of a fibrous composite material. Irrespective of the composition and shape of the rods, the manufacturing tolerances of the bore and the accuracy of expansion of the ends of the rod, which influence the curvatures naturally assumed by the rod segments and also the actual path followed by the lines of force, optimal conditions are always obtained in the anchoring zone by virtue of the sealing compound. If the fibrous composite material should differ in shape from a standard round rod, an internally profiled, for example prismatic, bore adapted to the profile of the fibrous composite material, or more particularly a corresponding anchor sleeve, should be used.

The interior of the bore of the anchorage for receiving the rod always has a larger internal diameter than the rod in its non-widened state. Even in the case of non-cylindrical profiles of fibrous composite materials, provision must be made for a corresponding "play" in the bore.

It is essential to the invention that the end of the rod is widened in the bore. The widening elements used may be standard elements which are capable of forcing the segments of the rod apart for example so-called cross nails. The widening elements may be made of metals or ceramics or even of plastics.

In general, the end of the rod is not fully widened on insertion into the anchor sleeve. In assembling an anchoring element according to the invention for a unidirectionally reinforced round profile, the end of the rod is for example notched in the direction of the fibres to cooperate with the widening element used. The widening element is pushed into the end of the rod until it is fixed by the elastic clamping force of the profile segments. A reactive resin is then poured into the profiled anchor sleeve until, after introduction of the end of the rod, the gap between the sleeve and the inserted profile and also between the rod and the widening element is completely filled. After hardening of the sealing compound, the rod, the widening element and the anchor sleeve form a reliable joint which is capable of withstanding heavy static and dynamic loads. An intermediate space preferably of from 1 to 3 mm filled with the sealing compound is left between the anchor sleeve and the non-widened part of the rod. The length of the rod accommodated in the bore should preferably amount to between 5 and 15 times the diameter of the rod.

The casting resin should be sufficiently fluid to completely fill any gaps between the segments of the rod, the widening element and the bore. The compressive strength of the sealing compound should be at least as great as the compressive strength of the matrix resins of the rod of fibrous composite material. Further requirements may be imposed on the sealing compound, depending on the conditions under which it is used. For example, it may be required to be resistant to temperature and/or certain media. The range of pourable elastomers and reactive resins is very wide. Unfilled, unsaturated polyester resins, epoxide resins or polyurethane resins are particularly suitable. However, they may also be filled with finely particulate fillers.

The anchoring elements according to the invention may be used for anchoring fibrous composite materials of a variety of different starting materials, including for example glass-fibre-reinforced polyester resin profiles and also profiles of carbon fibres and epoxide resins, preferably with unidirectionally oriented fibres.

The anchor sleeves are preferably made of metal, although bores in concrete may also be considered. In the case of round cross-sections, the profile of the inner surface of the anchor sleeve is preferably a screwthread. In the case of cast anchor sleeves, the inner surface may even have another structure.

The invention is described in more detail in the following with reference to the accompanying drawings, wherein:

BRIEF DESCRIPTION OF THE DRAWINGS

FIG. 1 is a partial sectional view of an anchoring element for a cylindrical rod;

FIG. 2 is a longitudinal section through the element of FIG. 1;

FIG. 3 is a cross-section through the element of FIG. 2 along line A-B;

FIG. 4 shows a widening element;

DETAILED DESCRIPTION OF THE INVENTION

Figure 5:
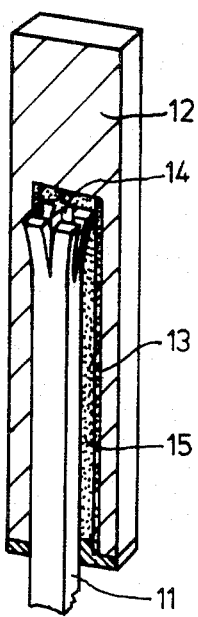
FIG. 5 shows an anchoring element for a rod of square cross-section.

The rod 1 of a unidirectionally reinforced fibrous composite material fits into an anchor sleeve 2, as shown in FIG. 1 in which the rod is anchored and through which the forces may be propagated in known manner. The anchor sleeve 2 is axially bored and provided with a screwthread 3. The end of the rod 1 is widened by a cross nail expending element 4. The empty space inside the anchor sleeve is completely filled with a pourable sealing compound 5.

The reference numerals in FIGS. 2 and 3 are the same as in FIG. 1.

FIG. 4 shows a suitable widening element.

Where the fibre-containing composite material rod 11 has a rectangular or square profile, as in FIG. 5, it is best to use a correspondingly angular anchor sleeve 12. In this case, too, a profile 13 in the form of a grating extending perpendicularly to the axis of rod 11 must be present, the end of the rod provided with a corresponding expanding element 14 and all the empty spaces left completely filled with a sealing compound 15.

Figure 6:
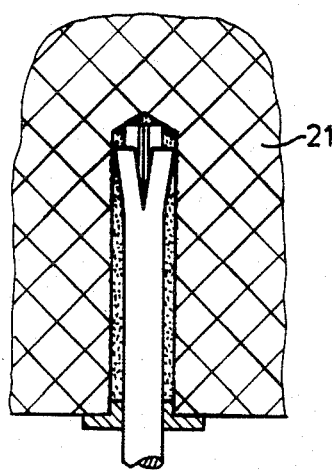
FIG. 6 shows a masonry anchorage.
Figure 7:
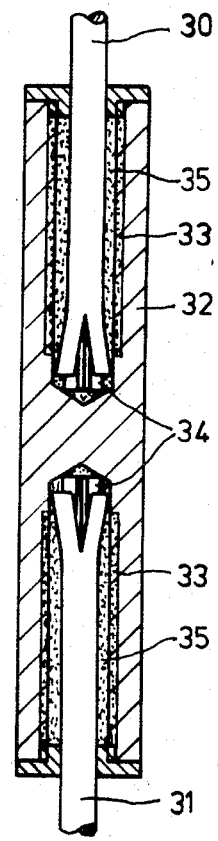
FIG. 7 shows an element for joining two profiles.

FIG. 6 shows a masonry anchorage. In this case, there may be no need to use a metallic anchor sleeve. Adequate profiling of the bore may be obtained for example by drilling in hardened concrete 21 or by integrally casting cores which are removed again after the concrete has hardened. FIG. 7 shows how rods can be joined to one another. The two rods 30,31 fit into an anchor sleeve 32 which has been drilled out from both ends and internally profiled, as shown at 33. The ends of the rods are expanded, as shown at 34, and cast in place, as shown at 35. The multiple anchorages are used for joining several rods having axes which align with one another and/or are perpendicular to one another.

EXAMPLE I

A rod of a fibrous composite material based on an unsaturated polyester resin and approximately 83% by weight of unidirectionally oriented glass fibres, and which has a round cross-section 8 mm in diameter, was cut crosswise to a depth of about 1 cm at both ends, after which cross nails of the type shown in FIG. 4, 35 mm long with a cross diameter of 6 mm, were driven with their points into the profile to such a depth that they were fixed by the elastic clamping force of the profile segment.

The anchor sleeves consisted of the material St 52, had an external diameter of 25 mm, were 80 mm long and had been provided with a full-length bore into which M 14-screwthreads had been cut.

The sleeves were temporarily closed at one end and filled to approximately three quarters of their length with a filler-free cold-hardening epoxide resin and the ends of the profiles with the cross nails were firmly pressed in so that the resin completely filled all the gaps between the threaded bores, the rod segments and the cross nails. In a tensile test, the anchorages thus produced failed at a load of 65,300 N.

An 8 mm diameter rod of a fibrous composite material anchored in the same way as in Example 1, which had been exposed to the elements for 3 months under a load of 42,000 N, reached a breaking force of 66,100 N in the subsequent tensile test.

EXAMPLE 2

A 7.5 mm diameter round bar of a fibre-containing composite material based on an unsaturated polyester resin and approximately 80% by weight of unidirectionally oriented glass fibres was cut crosswise to a depth of approximately 1 cm at both ends, after which cross nails 35 mm long with a cross diameter of 6 mm, of the type shown in FIG. 4, were driven with their points into the profile to such a depth that they were fixed by the elastic clamping force of the profile segments. The anchor sleeve consisted of the material St 52 and had an external diameter of 20 mm. An M 12-thread was cut into the 65 mm deep blind-end bore. Approximately 50 g of a quick-setting sealing compound were poured into the blind hole, after which the end of the profile with the cross nail was pressed firmly in. The pourable sealing compound consisted of 20 parts by weight of an unsaturated polyester resin, 40 parts by weight of quartz sand (particle diameter 1 mm) and 40 parts by weight of quartz powder (particle diameter 200 μm). The sealing compound completely filled all the gaps between the threaded bore, the rod and the cross nails. Anchoring elements produced in this way failed at a load of 58,600 N in the tensile test.

What is claimed is:

1. In an anchor for a rod of fibrous composite material including a sleeve having a bore receptive of said rod, the bore being profiled substantially perpendicularly to the axis of the received rod and an element for widening the received end of the rod, the improvement wherein the axial cross section of the bore is circular and greater than and spaced from the non-widened cross section of the rod and the bore as defined by the profile is overall generally cylindrical and substantially constant along the length of the bore and wherein the widening element has a substantially constant cross section along the length thereof and further comprising sealing compound completely filling the space in the bore between the rod, the widening element and the sleeve.

2. The anchor according to claim 1, wherein the sealing compound has the same compressive strength as the composite material matrix resin of the rod to be received.

3. The anchor according to claim 2, wherein the sealing compound is selected from the group comprising unfilled reactive resin, filled reactive resin, unfilled pourable elastomer and filled pourable elastomer.

4. The anchor according to claim 1, wherein the profile comprises a screw thread.

5. The anchor according to claim 4, wherein the sleeve is cylindrical.

6. The anchor according to claim 1, wherein the bore is configured to receive a length of rod 5 to 15 times the diameter thereof.

7. In combination: a rod of fibrous composite material with unidirectionally oriented fibers; and the anchor according to claim 1.

8. A method of anchoring a rod of fibrous composite material comprising the steps of:
    forming a bore in a sleeve which bore has a circular axial cross section greater than that of the rod so as to be spaced therefrom and which is substantially cylindrical along its length;
    profiling the surface of the bore substantially perpendicular to the axis of the rod to be anchored while retaining its general cylindrical configuration;
    widening the end of the rod of fibrous composite material with a widening element having a substantially constant cross section along the length thereof;
    at least partially filling the bore with a sealing compound and;
    thereafter pressing the widened end of the rod into the bore such that the sealing compound completely fills all the gaps in the bore between the widening element, rod and sleeve.

* * * * *